INVENTORS:
FRED W. PIKE
DARRELL E. ARMSTRONG
BY: Dawson, Tilton, Fallon, Lungmus & Alexander
ATT'YS

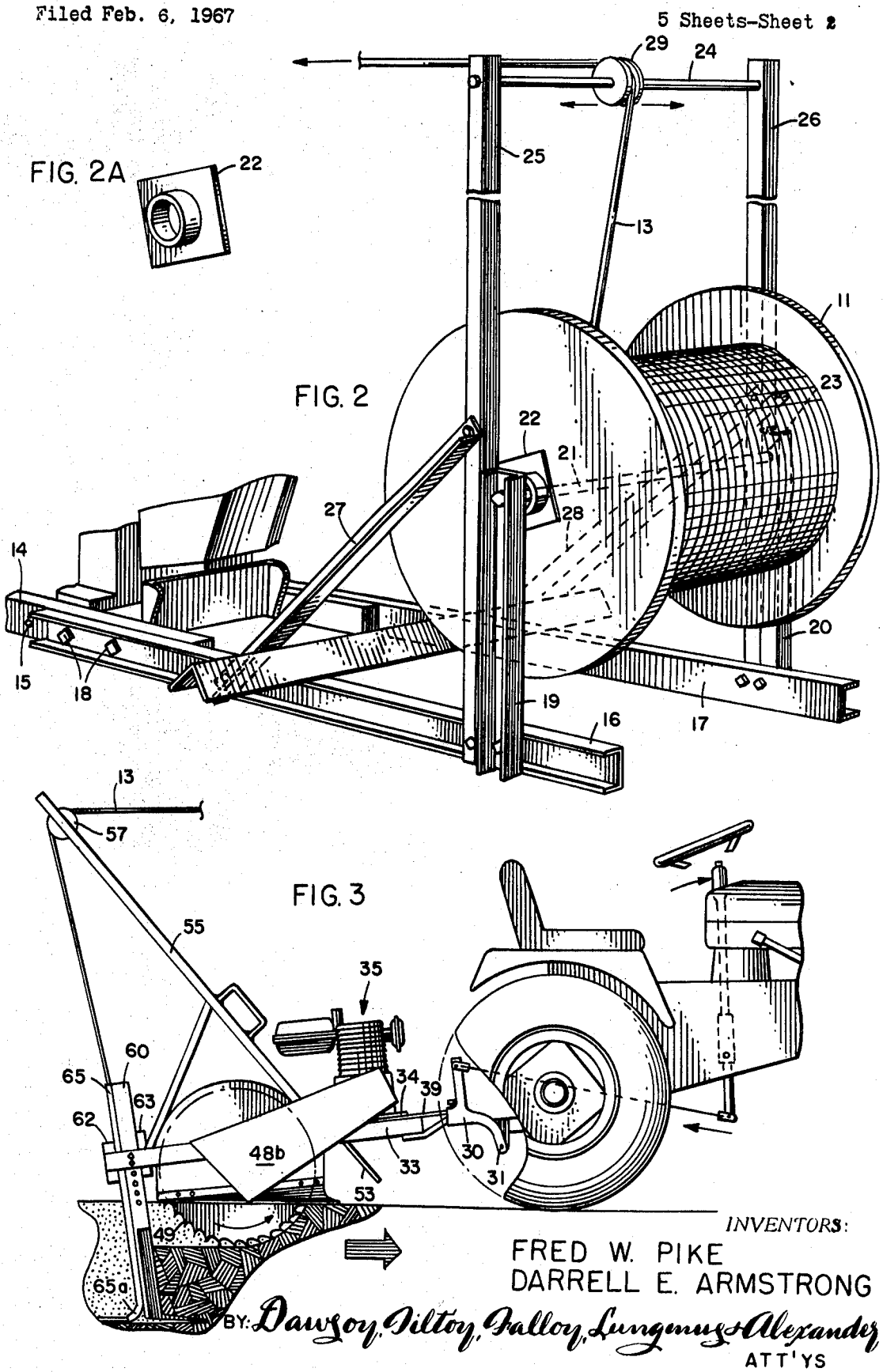

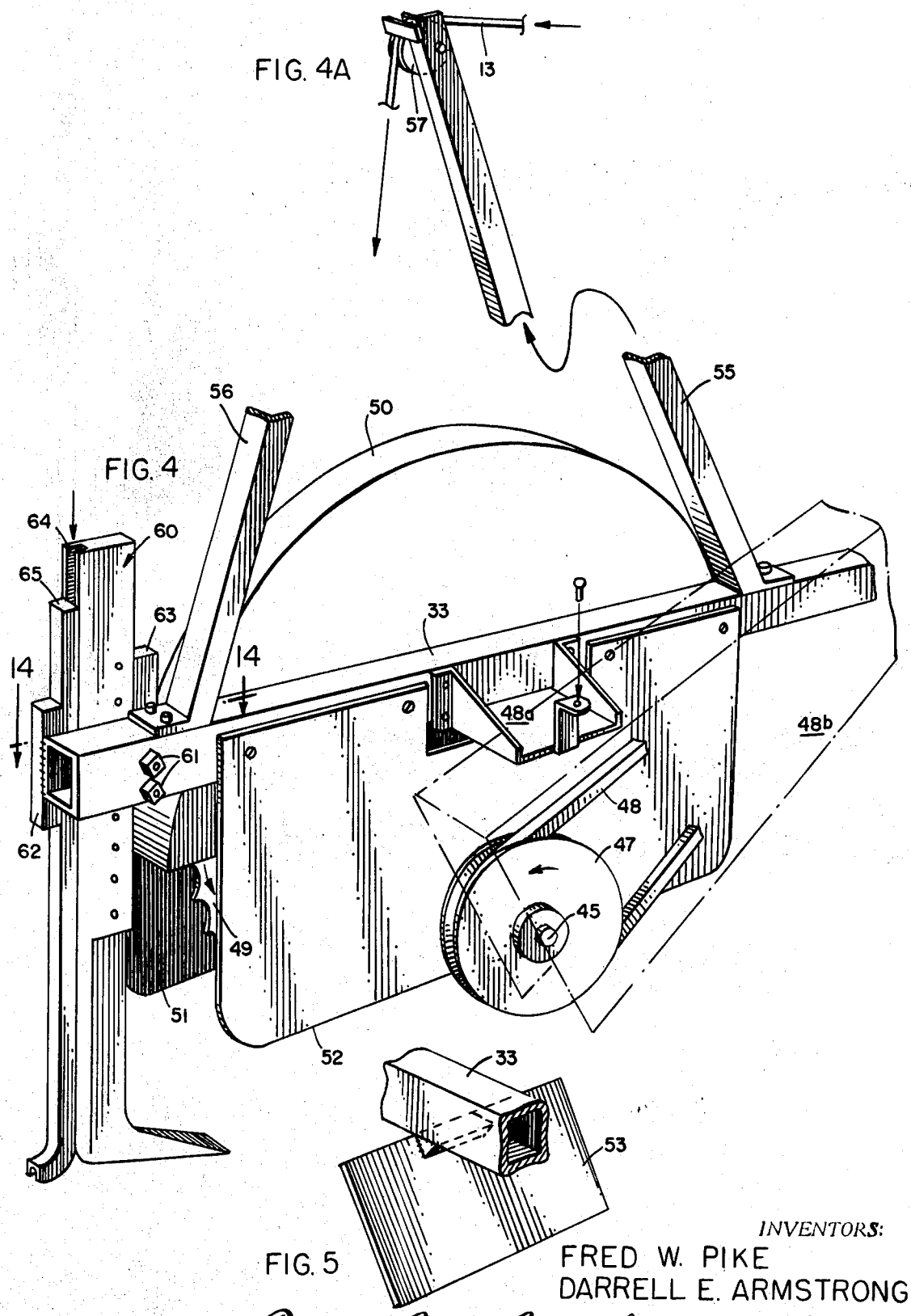

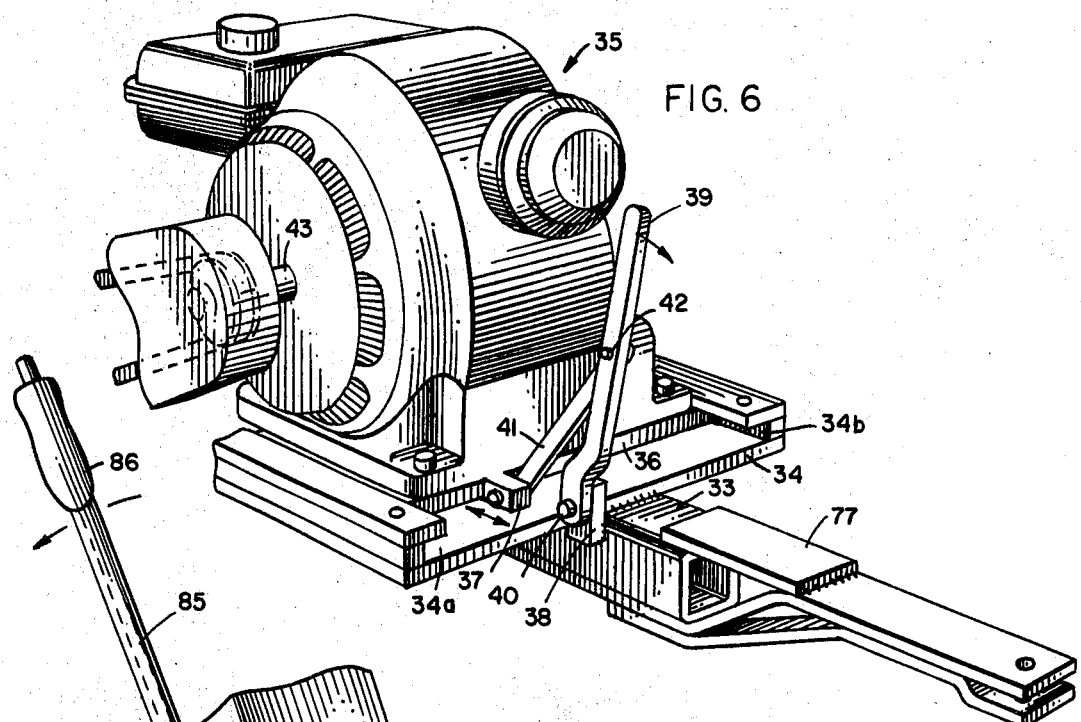
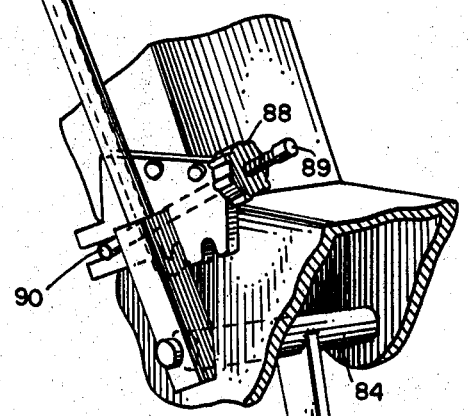
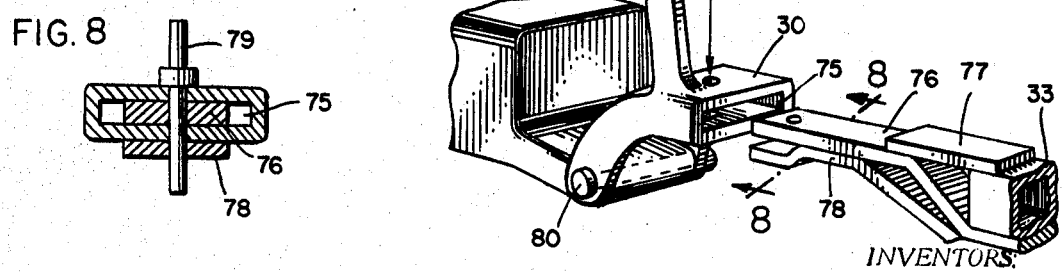

Feb. 2, 1971  F. W. PIKE ET AL  3,559,414
APPARATUS AND METHOD FOR LAYING FLEXIBLE CABLE
Filed Feb. 6, 1967  5 Sheets-Sheet 5
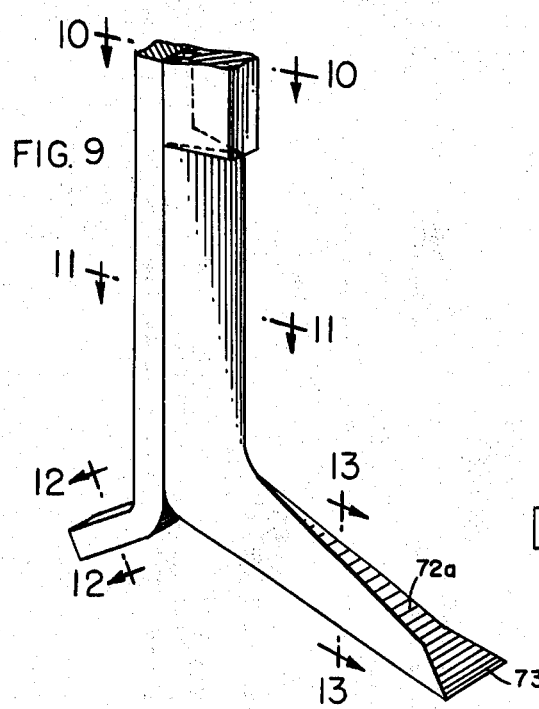
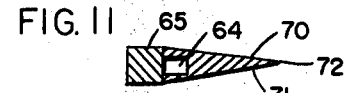
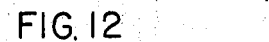
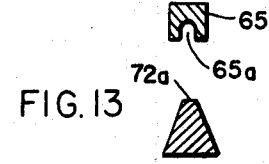
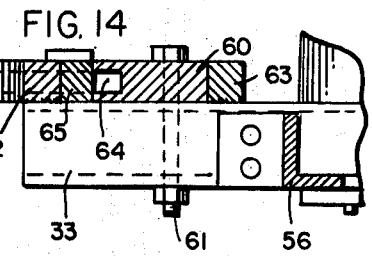
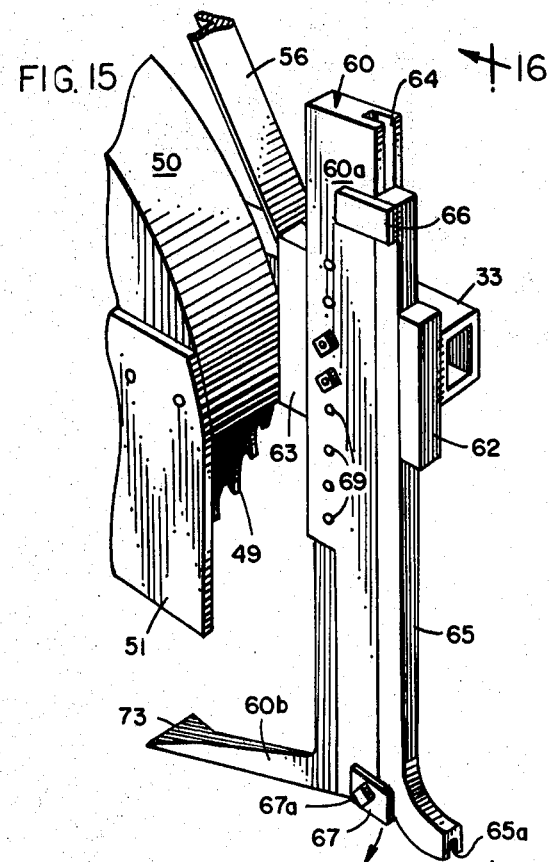
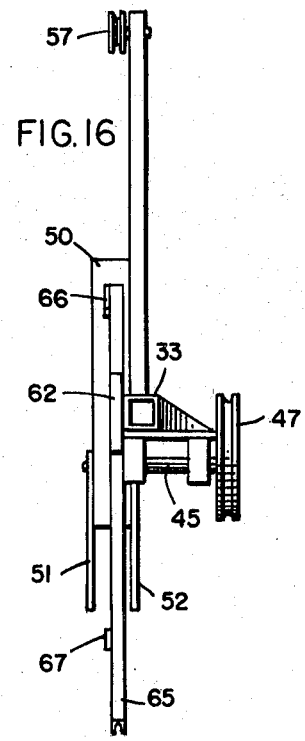
INVENTORS:
FRED W. PIKE
DARRELL E. ARMSTRONG
BY Dawson, Tilton, Fallon, Lungmus & Alexander
ATT'YS United States Patent Office 3,559,414
Patented Feb. 2, 1971

3,559,414
APPARATUS AND METHOD FOR LAYING FLEXIBLE CABLE
Fred W. Pike, 14 Garden Ave., and Darrell E. Armstrong, 105 Huber St., both of Pontiac, Ill. 61764
Filed Feb. 6, 1967, Ser. No. 614,336
Int. Cl. E02f 5/02, 5/18
U.S. Cl. 61—72.6                                    3 Claims

ABSTRACT OF THE DISCLOSURE

An attachment for use with a small garden tractor in laying flexible cable beneath the ground. Hitched to the rear of the tractor, the attachment includes a vertically-adjustable plow shoe for forming a tunnel or channel for the cable, a power-driven rotary blade or slicer in front of the plow shank for opening a narrow slit in the ground to a depth less than the depth of the shoe, and a cable guide for feeding cable into the tunnel behind the plow shoe. The plow shoe and the rotating blade cooperate with the tractor hitching mechanism to provide a tunnel having uniform depth beneath the surface of the ground.

BACKGROUND

The present invention relates to apparatus and method for laying flexible cable; more particularly, the invention relates to apparatus and method for laying flexible cable with a small garden tractor.

Heretofore, the laying of flexible cable such as telephone cable, weather-proof electrical distribution cable and the like, has been accomplished in various ways. One such way is to simply pull a plow behind an intermediate size tractor. However, such an arrangement has a number of disadvantages including the fact that an intermediate size tractor does not have the mobility and flexibility in application that a small garden tractor, for instance, has. In addition, the wheels of intermediate and larger size tractors are likely to leave deep ruts in the turf adjacent the cable after it is layed. Further, the plowshares of the larger tractors have left relatively large and unseemly furrows in the turf after the cable is layed. This is a serious drawback of these prior devices because, in most cases, and particularly when telephone cable is being layed, the cable is usually laid beneath a lawn, and the leaving of a large furrow is unsatisfactory for these applications.

At the same time, it has been found impossible to pull a plow behind a conventional garden tractor, which has an engine in the range of eight to fifteen horsepower and no power take-off, at the required depth of eight to ten inches.

SUMMARY

The present invention overcomes the problem of pulling a plow behind a conventional garden tractor at the required depth of eight to ten inches by providing a power-driven rotating blade or slicer in front of the plow shank to cut a narrow leading slit in the ground to a depth of about one-half the depth of the plow shoe behind which the cable is being placed. The cutting side of the blade is rotated in a direction against that in which the tractor is traveling to throw stones and loosened dirt out of the way thereby leaving a relatively clean slit and reducing the load on the plow shank while at the same time providing a space into which the plow shoe may displace earth while burrowing.

The width of the plow shank has been reduced at ground level so that the only furrow left in the turf is a narrow slit which is easily filled by running a tractor wheel over the slit after the cable has been layed. This forces the dirt which had been thrown to the side of the slit formed by the blade back into the groove to cover it up. The reduced weight of the smaller tractor obviates the problem of ruts caused by the wheels.

A guide is further provided behind the plow shank with a removable bar for feeding the flexible cable behind the plow shoe. By means of this feature a cable may be suspended in the air over a distance and then dropped to ground level and fed through the cable-laying apparatus without breaking a connection or cutting the cable.

Further, the attachment is permitted some lateral play behind the tractor thereby enhancing its ability to follow the tractor and provide a clean, narrow cut as distinguished from that which would be caused by the twisting of the blade resulting from a rigidly fastened attachment.

Other advantages and features of the present invention will be obvious to persons skilled in the art from the following detailed description accompanied by the attached drawing in which identical reference numerals will refer to like parts in the various views.

THE DRAWING

FIG. 2 is a side perspective view of a rig fastened to the tractor frame for supporting a spool of cable for laying;

FIG. 2A is a perspective view of a spacer-bearing for attachment to a conventional cable spool in mounting it on the rig of FIG. 2A;

FIG. 3 is a side elevational view of the cable-laying attachment of FIG. 1 in a lowered position for laying cable;

FIG. 4 is a perspective view of the cable-laying attachment of FIG. 1 taken from the side and rear;

FIG. 4A illustrates a pulley at the top of the cable-laying attachment for feeding the flexible cable;

FIG. 5 shows the front debris baffle of the cable-laying attachment;

FIG. 6 illustrates a sliding mount for the motor of the cable-laying attachment;

FIG. 7 is a broken-away schematic view showing the tractor apparatus for vertical movement of the cable-laying attachment;

FIG. 8 is a rear section view of the hitch between the attachment and the tractor;

FIG. 9 is a perspective view of the plow shank and shoe together with the cable guide;

FIGS. 10–13 illustrate various cross sections of the tunneling plow as indicated in the sight lines of FIG. 9;

FIG. 14 is a section view taken through the sight line 14—14 of FIG. 4;

FIG. 15 is a perspective view of the adjusting mechanism for the plow shank; and FIG. 16 is a rear elevation view of the plow shank and cable guide taken through the sight line 16—16 of FIG. 15.

DESCRIPTION

Figure 1:
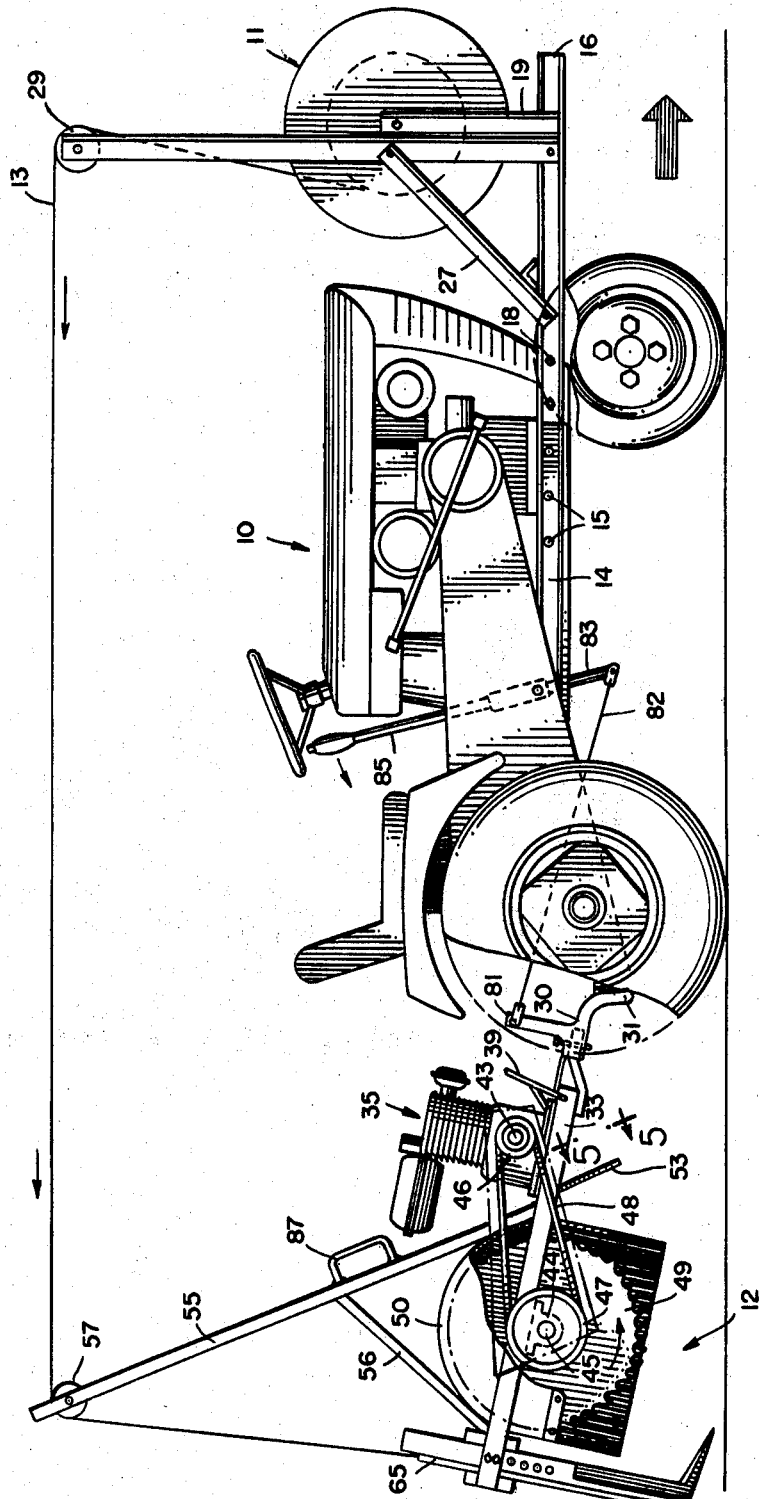
FIG. 1 is a side elevational view of a conventional garden tractor with attached cable-laying apparatus according to the present invention wherein the attachment is in a raised position for transporting.

Referring then to the drawing, in FIG. 1 is shown a self-contained unit for laying flexible cable comprising a small conventional garden tractor generally designated as 10, a spool of cable 11 rotatably mounted on the front of the tractor 10, and a cable-laying device attached to the rear of the tractor 10 and generally designated as 12. The cable-laying device 12 is shown in FIG. 1 in a raised position for transporting, that is, it is elevated above ground level, and may be conveniently transported short distances in this manner. For longer distances, the attachment 12 may be unfastened, and the tractor 10 and attachment 12 will easily fit in the back of a pickup truck.

The spool 11 is conventionally provided with a flexible cable 13 wound about its axle. The tractor 10 includes a frame 14 which is provided with a series of apertures 15. A pair of horizontal support beams, 16 and 17 (see FIG. 2) are secured to the tractor frame 14 by means of bolts 18 extending through the apertures 15 and secured on the other side of the frame 14. Vertical support beams 19 and 20 are similarly bolted respectively to the horizontal support beams 16 and 17 in front of the tractor 10. A shaft 21 is connected between the tops of the beams 19 and 20 above the beams 16 and 17, and the spool 11 is rotatably carried by the shaft 21 separated from the beams 19 and 20 by means of bearing-spacers 22 and 23 intermediate the beams 19 and 20 and the disc-shaped sides of the spool 11. The bearing-spacer 22 is illustrated more clearly in FIG. 2A.

A second horizontal shaft 24 is mounted to two vertical beams 25 and 26 which are rigidly connected to the horizontal beams 16 and 17. The shaft 24 is above the shaft 21. The beam 19 may be welded or otherwise rigidly secured to the beam 25 to add strength to the spool-supporting rig. The beams 20 and 26 may be similarly secured together. Lateral support is further provided to the vertical beams 19, 20, 25 and 26 by means of supporting irons 27 and 28 connected respectively to the beams 16 and 17 to form triangular supports therewith.

Rotatably and slidably mounted on the shaft 24 is a pulley 29 which receives the cable 13 and rotates about the shaft 24 as the cable 13 is fed to the rear end of the tractor. The pulley 29 traverses the shaft 24 as the point at which cable 13 unwinds from the spool 11 moves axially of the spool 11. This traversing motion of the pulley 29 is illustrated by the arrows parallel to the shaft 24 at the top of FIG. 2.

Referring now to FIGS. 3 and 4, the cable-laying attachment 12 is connected to a tractor hitch generally designated as 30 in FIGS. 1, 3 and 7. The hitch 30 is conventional, and it is rotatably mounted as at 31 for movement in a vertical arc, as will be described in more detail below. The main supporting frame for the attachment 12 is a box-shaped beam 33 which extends rearward of the hitch 30 at a generally horizontal disposition.

A platform 34 defining elongated side grooves or slides 34a and 34b extending longitudinally of the frame 33 is welded to the top of the frame 33. A conventional gasoline engine of a horsepower rating preferably of eight horsepower, generally designated in the drawing as 35, is mounted to a base plate 36 which has a forwardly projecting lug 37 and is adapted to slidably fit within the side grooves 34a and 34b of the platform 34 for restricting vertical and lateral motion while allowing the plate 36 to slide along the platform 34 in the direction of the axis of the frame 33, as indicated by the arrow adjacent lug 37 in FIG. 6.

Still referring to FIG. 6, an upwardly projecting lug 38 is welded to the frame 33 in front of the platform 34. A handle 39 is pivotally connected as at 40 to the lug 38. A link 41 is pivotally connected to the tab 37 on the motor base plate 36 at one end and pivotally connected to the handle 39 as at 42 intermediate the end of the handle 39. When the handle 39 is raised, as shown in FIG. 6, the motor 35 is forced to a rearward position thereby relieving it of its load for ease in starting. When the motor 35 has reached its operating speed, the lever 39 is moved downward thereby pulling the motor base plate 36 and the motor 35 to a forward locking position in which the load, as described below, is applied to the motor shaft which is indicated by the reference numeral 43.

Referring again to FIG. 1, a collar 44 is fixed to the bottom of the frame 33 rearward of the motor 35. A shaft 45 is journaled in the collar 44 extending transverse of the frame 33. A first pulley 46 is mounted on the shaft 43 of the motor 35, and a second pulley 47 is mounted on the shaft 45. An endless belt 48 is fitted around the pulleys 46 and 47 for coupling motion between them when the handle 39 is in a forward, locking position, as described above.

On the other end of the shaft 45 is mounted a blade 49 which is preferably a conventional saw blade, as is shown in the drawing. A steel guard 50 is attached to the frame 33 and fitted around the blade 49 to protect accidental contact with the blade 49.

As seen most clearly in FIG. 4, a brace 48a is attached to the side of frame 33 for supporting a pulley cover shown in phantom in FIG. 4 and generally designated 48b, which normally covers the two pulleys 46 and 47 and the endless belt 48.

Still referring to FIG. 4, depending flexible side skirts 51 and 52 are attached to the box beam 33 on either side of the blade 49. When the blade 49 is lowered to a cutting position, the flexible skirts 51 and 52 flare outwardly and engage the ground for forming guards protecting against the scattering of debris. In addition to the top and side guards, and because the cutting edge of the blade is driven counter to the direction in which the device is pulled, a baffle plate 53 is mounted to the bottom of the frame 33 in front of the blade 49, as seen in FIG. 5 in perspective and in FIG. 1 from the side.

Referring now to FIGS. 1, 4 and 4A, a beam 55 is rigidly attached to the top of the frame 33 and inclined rearwardly of the tractor 10. A second beam 56 is connected to the top of the frame 33 behind the beam 55 and connected to the beam 55 intermediate its ends to form a brace in supporting the beam 55. Rotatably mounted adjacent the top of the beam 55 is a pulley 57 which receives the flexible cable 13 in its horizontal position from the pulley 29 and feeds the cable 13 downward.

A plow generally designated as 60 is removably secured at the rear of the frame 33 by means of bolts and nuts 61 which extends through the shank of the plow 60 and the frame 33. Two guiding blocks designated as 62 and 63 are welded to the frame 33 adjacent the shank of the plow 60, and they extend vertically for preventing rotation of the plow 60 when it is in a tunneling position while permitting vertical adjustment of the plow shoe, as described below.

At the back of the plow 60 is provided a vertically-disposed channel 64 having an open back for receiving the flexible cable 13 from the pulley 57. The channel 64 takes the form of a rectangular groove longitudinal of the shank of the plow 60; and a removable cover bar 65 provides the fourth side to the channel 64. Cover bar 65 is solid throughout its vertical length to provide additional resistance to bending of the plow while digging, and it defines a rearwardly projecting tongue 65a having an inverted U cross section (see FIG. 12) for guiding the cable behind the shoe 60b. As can be seen in FIG. 15, a first dog 66 is welded adjacent the top of the cover bar 65 for engaging the side of the plow 60. A second dog 67 is removably attached by a bolt 67a threadably received adjacent the bottom of the plow 60 for engaging the side of the cover bar 65 on which the dog 66 is attached. The frame 33 holds the cover bar 65 on the side opposite that which supports the dog 66. Hence, when the dog 67 is rotated downward by loosening bolt 67a, the cover bar 65 may be rotated between the plow 60 and the guide member 62 in a plane transverse of the axis of frame 33.

It is noted that prior cover plates have been adapted to be detached by rotation in the same plane formed by the cable being laid, but this is the same direction in which the strength of the cover plate and the channel 64 is required. Hence, the present invention advantageously provides for removal of the cover bar 65 by allowing its removal only in a plane transverse of the layed cable.

It will also be noted from FIGS. 4 and 15 that the upper part of the shank of plow 60 is provided with a series of transverse holes 69 for receiving bolts 61 whereby the shoe of plow 60 may be suitably positioned at different vertical distance from the frame 33. This feature will be explained in more detail below.

FIG. 14 most clearly shows the guide members 62 and 63 welded to the frame 33 and positioned vertically (i.e., perpendicular to the plane of the page in FIG. 14) and between which are sandwiched the plow 60 and the cover bar 65. Additional strength is added to the channel by making the bar 65 a solid rod as shown in FIG. 14.

Referring now to FIGS. 9–13, the shape of our preferred plow will now be described in detail. The plow 60 is seen as comprising a vertical shank portion 60a and a shoe 60b extending toward the tractor 10 at right angles to the shank 60a. As has already been described, the top portion of the shank 60a has a rectangular cross section indicated in FIG. 10 with the rectangular channel 64 formed longitudinally in its back. This rectangular cross section of the upper part of the shank 60a and cover bar 65, as mentioned, permits cooperation with the rigid guide members 62 and 63 to provide increased resistance against rotation when the plow 60 is tunneling.

As seen in section in FIG. 11, beneath the rectangular upper part, the shank 60a is formed into two tapered sides 70 and 71 defining a vertical cutting edge 72 to decrease drag resistance. The edge 72 fits into the slit cut by the blade 49 and extends below the depth of the slit.

The forwardly projecting shoe 60b has a generally triangular cross section (FIG. 13) with a flat bottom and an increasing truncation 72a toward the toe portion which has an outward flare thereby providing a horizontal blade 73. As will be appreciated from a consideration of this structure, the horizontal blade 73 does the initial cutting at a depth at which the cable is to be placed, and the truncated upper part 72 acts as a shovel or wedge for forming a tunnel in which the cable is to be laid. The effect of the burrowing is not seen at the ground level since the displaced dirt is wedged up into the slot formed by the blade 49.

Turning now to FIGS. 7 and 8, the attachment of the frame 33 to the hitch 30 will be described in detail, as well as a particular mechanism for raising the attachment to a transporting position.

As can be seen from the drawing, the hitch 30 defines a rectangular-shaped receptacle 76 for receiving a similarly shaped bar 76 which angles downward and is welded to the bottom of the frame 33 of the attachment. A second bar 77 is welded to the top of the frame 33 and to the top of the bar 76 for providing beam strength. A third supporting bar 78 is attached to the bottom of the first bar 76 and is then separated therefrom to form a yoke for fitting over the lower wall of the receptacle 75. Holes are formed in the top and bottom of the receptacle 75 and the bars 76 and 78 for vertically receiving a bolt 79 in pivotally connecting the attachment to the hitch 30. As can best be seen from FIG. 8, the width of the receptacle 75 is somewhat greater than the width of the bar 76 which it receives. This is to allow for some rotation of the frame 33 relative to the tractor, and it advantageously allows the attachment to follow the motion of the tractor as distinguished from twisting the cutting blade 49 when there is a rigid beam connection. This latter has been found to tear up the turf and increase the resistance to driving the blade 49 when the laying of cable is along a curve. Other rotatable hitching connections can easily be conceived.

As seen schematically in FIG. 7, the hitch 30 is pivotally mounted to the tractor frame as at 80 for pivotal motion in a vertical plane. An arm 81 projects upwardly from the top of the hitch 30. A wire cable 82 is connected at one end to the top of the arm 81 and at the other end to the bottom of a second arm 83 which is rigidly attached to a cross bar 84 pivotally mounted in the frame of the tractor.

A lever 85 which projects through the bottom of the tractor and is provided with a handle 86 adjacent the operator's seat is rigidly connected to the cross bar 84 for rotating it. Hence, when the handle 85 is pulled rearward of the tractor 10, the cross bar 84 will rotate the arm 83 clockwise (as viewed in FIG. 7) thereby raising the tractor hitch 30. The frame 33 of the attachment is cantilevered, and it will be lifted to a transporting position, as shown in FIG. 1, if enough force can be exerted on the handle 85. However, it has been found advantageous to provide a handle, indicated by reference numeral 87 in FIG. 1, which is connected to the bar 55 which supports the pulley 57. Thereby an operator sitting in the seat of the tractor 10 can place one hand on the handle 86 of the lever 85 and a second hand on the handle 87. When the two are pulled together, a single person can easily raise the attachment to its transporting position. The attachment is then held in this position by screwing a cap, indicated at 88 in FIG. 7 down upon a threaded rod 89 which forms a foot portion 90 preventing counterclockwise rotation of the handle 85.

It will be noted that this same hitch-raising mechanism, which is conventionally provided on most garden tractors, will cooperate with the vertical adjustment structure of the plow 60 to regulate the depth of the cut of the plow beneath the surface of the ground. Hence, when the plow 60 is adjusted by means of the apertures 69 to define a specific vertical relationship between the cutting edge 73 of the shoe 60b and the powered cutting blade 49, the depth of the cut can be adjusted by rotating the cap 88 to permit raising or lowering of the plow 60.

OPERATION

Having thus described in detail the mounting of a spool of flexible cable on the front end of an ordinary garden tractor together with a specific embodiment of a preferred cable-laying attachment and its hitching to a tractor, a typical operation for the apparatus will now be described. The spool 11 of flexible cable 13 desired to be layed at a depth of eight to ten inches, for instance, below the surface of the ground is rotatably mounted on the front end of a conventional garden tractor having a horsepower rating of between six and twenty-four horsepower. The flexible cable 13 is wound over a rotatable pulley 29 which is slidably mounted on the shaft 24. The cable 13 is then fed over a second pulley 57 and curved downward through a channel 64 defined on three sides by a groove cut in the rear of the shank 60a of the plow 60, and on the fourth side by a cover bar 65. The cover bar 65, adjacent its bottom, defines a rearward curving channel 65a having an inverted U cross sectional shape for feeding the cable into the ground.

An initial judgment is made as to the height that will be required between the leading edge 73 of the plow shoe 60b and the lowest cutting edge of the blade 49. This varies from application to application depending on ground composition, the weather, and so on. The vertical position of the plow 60 relative to the frame 33 is then adjusted to make this setting. This is accomplished by means of the bolts 61 and series of apertures 69 provided vertically along the shank 60a of the plow 60.

When this distance has been set, the cap 88 on the tractor 10 is adjusted on the rod 89 for limiting the downward motion of the handle 88 thereby limiting the depth to which the plow 60 will dig beneath the ground surface by holding the frame 33 in cantilever behind the tractor.

It is noted at this point, that since both the blade 49 and the shoe 60b have a tendency to lower the cutting device toward the ground, the mechanism for limiting forward motion of the handle 85 advantageously cooperates with the cutting device for maintaining a uniform depth for laying the cable beneath the ground surface. Further advantage is achieved by permitting an independent setting of the depth of the slot cut by blade 49, as has been explained.

When it is desired to start cutting, the lever 39 is pulled upward thereby moving the motor 35 rearward and causing slack in the belt 48 for ease in starting the motor 35. Once the motor 35 is started, the lever 39 is pushed down in locking position thereby taking up the slack in the belt 48, and the blade 49 is driven in a counterclockwise direction when viewed in FIG. 1. In our preferred embodiment, the motor 35 for driving the blade 49 is rated for eight horsepower at 3800 r.p.m.; the diameter of blade 49 is 20 inches; the diameter of pulley 47 is 7 inches; and the diameter of pulley 46 is 2.75 inches.

It will be noted that during cutting, the width of the slit cut by the blade is approximately ¼ inch, whereas the width cut by the back of the plow shank is approximately ¾ inch. That part of the ground which is cut by the blade 49 will be thrown forward against the baffle plate 53 and directed back towards the ground. A little furrow will be developed on either side of the slit cut by the blade 49 when the shank of the plow 60 is pulled to cut the channel. Once the cable is laid, the wheels of the tractor can be run over the furrows to push the loose dirt back into the slit to cover up the laid cable thereby causing only a minor scar in the turf. When it is desired to transport the cutting device a short distance, a single operator can raise it to a transporting position by pulling the handles 87 and 85 together and locking the handle 85 when the cutting device is raised.

With this arrangement, we have found that with a ten horsepower tractor and an eight horsepower gasoline engine adapted to drive the rotating blade, a very satisfactory job can be accomplished in laying half-inch flexible cable, whereas, without the blade, a twenty-four horsepower tractor is required to pull a conventional plow at the required depth.

Thus has been described a self-contained apparatus for laying cable beneath the surface of the ground. It will also be noted that when transportation is required over a greater distance, the cutting device can easily be removed from the hitch 30 and the entire assembly can be transported by a pickup truck as contrasted to the larger transporting truck required for a bigger tractor.

Having thus described my invention and its operation, it will be obvious to persons skilled in the art that equivalent structure may be substituted for that which has been described with like result; and it is therefore intended that all such modifications and substitutions be covered as they are embraced wthin the spirit and scope of the appended claims.

We claim:

1. In combination with a garden tractor, apparatus for laying flexible cable comprising: a frame, means on said tractor for attaching said frame to said tractor in cantilever while allowing lateral play therebetween, a blade rotatably mounted on said frame for rotation in a vertical plane in the direction of travel of said tractor, power means coupled to said blade for driving said blade such that the lower cutting edge thereof moves toward said tractor to clear a slit in ground traversed by said tractor, a plow adjustably mounted on said frame, said plow including a vertical shank for mounting to said frame and a forwardly projecting shoe integral with the bottom of said shank, the lower portion of said shank defining a decreasing taper toward said tractor for following in said slit and for cutting ground beneath the depth of said slit, said shoe defining a leading horizontal cutting edge and an increasing vertical dimension and decreasing width from said edge to said shank for forming a tunnel beneath said slit, said shank further defining a channel longitudinal thereof for receiving a cable, means on said tractor for rotatably supporting a spool of said cable, means receiving cable from said spool for feeding it to said channel of said plow shank, a cover bar removably secured to enclose said channel of said plow shank, said bar being removable from said shank by rotation in a plane transverse of laid cable, said bar further defining a rearwardly depending section having an inverted U cross section for directing said cable behind said shoe, means on said tractor for adjusting the elevation of said frame attaching means whereby the depth of said tunnel beneath the surface of the ground may be adjusted, and means for separately adjusting the vertical distance between the lower cutting edge of said blade and the horizontal cutting edge of said shoe.

2. In combination with a garden tractor, apparatus for laying flexible cable comprising: frame attached to said tractor, a cutter mounted on said frame for rotary motion on a generally horizontal axis transverse of the direction of travel of said tractor, means coupled to said cutter for driving said cutter such that the cutting edge thereof moves toward said tractor while in the ground to clear a slit of generally uniform depth in ground traversed by said tractor, a plow supported by said frame and located behind said cutter, said plow defining an edge for tunneling beneath said ground after said cutter and including a vertical shank rigidly mounted on said frame and a forwardly projecting shoe, means for feeding said cable behind said plow into the tunnel formed thereby, means for adjusting the elevation of said frame whereby the depth of said tunnel beneath the ground may be fixed, means for adjusting the vertical distance between said plow shoe and said power-driven cutter whereby the depth of a shoe formed by said cutter may be adjusted separately of the depth of said tunnel, and means including a hitch on said tractor for holding said frame in cantilever behind said tractor.

3. The apparatus of claim 2 wherein said plow shank includes first and second vertical surfaces tapering outwardly from a cutting section to a rear section defining a channel for receiving said cable and said shoe section extends forward of said tapered section defining a horizontal leading cutting edge and an increasing cross sectional area for forming a tunnel for said cable.

References Cited

UNITED STATES PATENTS

| 3,111,007 | 11/1963 | Ryan | 61—72.1 |
| 3,173,272 | 3/1965 | Knapp et al. | 61—72.6 |
| 3,332,249 | 7/1967 | Idoine | 61—72.6 |

JACOB SHAPIRO, Primary Examiner

U.S. Cl. X.R.

37—193